United States Patent
Chiloyan et al.

(10) Patent No.: US 6,683,939 B1
(45) Date of Patent: Jan. 27, 2004

(54) METHOD AND APPARATUS FOR LOGGING DTMF PHONE SYMBOLS DIALED FROM AN EXTENSION

(75) Inventors: John H. Chiloyan, Woodinville, WA (US); Leonard D. Zuvela, Mukilteo, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/295,128

(22) Filed: Apr. 20, 1999

(51) Int. Cl.[7] .............................................. H04M 1/64
(52) U.S. Cl. ..................... 379/70; 379/142.18; 379/386
(58) Field of Search .......................... 379/164, 142.13, 379/142.18, 906, 386, 70, 112.01

(56) References Cited

U.S. PATENT DOCUMENTS

| | | | |
|---|---|---|---|
| 4,656,657 A | * 4/1987 | Hunsicker | 379/140 |
| 5,146,490 A | * 9/1992 | Beckman | 379/112.01 |
| 5,351,276 A | * 9/1994 | Doll et al. | 370/354 |
| 5,535,265 A | 7/1996 | Suwandhaputra | 379/97 |
| 5,666,397 A | * 9/1997 | Lamons et al. | 379/32.02 |
| 5,734,706 A | * 3/1998 | Windsor et al. | 379/142.01 |
| 5,742,669 A | * 4/1998 | Lim | 379/130 |
| 6,052,409 A | * 4/2000 | Quirk et al. | 375/220 |
| 6,134,310 A | * 10/2000 | Swan et al. | 379/188 |
| 6,229,878 B1 | * 5/2001 | Moganti | 379/67.1 |
| 6,240,164 B1 | * 5/2001 | Jensen | 379/32.01 |
| 6,438,224 B1 | * 8/2002 | Forman | 379/386 |

FOREIGN PATENT DOCUMENTS

| | | |
|---|---|---|
| EP | 0 510 412 A | 10/1992 |
| WO | WO 96 02996 A1 | 2/1996 |
| WO | WO 98 39941 A | 9/1998 |

OTHER PUBLICATIONS

"US West PC Caller ID Website", Oct. 7, 1999, URL: http://www.uswest.com/home/products/pccallerid/features.html.

* cited by examiner

Primary Examiner—Fan Tsang
Assistant Examiner—Simon P. Sing
(74) Attorney, Agent, or Firm—Theodore M. Magee; Westman, Champlin & Kelly, P.A.

(57) ABSTRACT

A method and apparatus logs outgoing phone symbols dialed from an extension. To log the phone numbers, a switching network is coupled to the phone lines and passes a Dual Tone Multiple Frequency signal from the extension to a CODEC. The CODEC converts the analog signal it receives into a series of digital values that are passed to a digital signal processor. The digital signal processor decodes the series of digital values into a set of dialed-symbol values indicative of symbols dialed by the extension. The dialed-symbol values are packaged by a processing unit interface and transmitted to the processing unit where they are stored in a log database.

4 Claims, 7 Drawing Sheets

FIG. 6

| PACKET INDEX | FIELD NAME |
|---|---|
| 0X00 | PNUM & PID |
| 0X01 | STATE COMMAND |
| 0X02 | STATEFLAGS1 |
| 0X03 | SYSTEMSTATE |
| 0X04 | STATEFLAGS2 |
| 0X05 | RESERVED |
| 0X06 | RESERVED |
| 0X07 | RESERVED |
| 0X08 | RESERVED |
| 0X09 | RESERVED |
| 0X0A | RESERVED |
| 0X0B | RESERVED |
| 0X0C | CHECKSUM |
| 0X0D | CHECKSUM |

| BIT POSITION | | | | | | | | DESCRIPTION |
|---|---|---|---|---|---|---|---|---|
| 7 | 6 | 5 | 4 | 3 | 2 | 1 | 0 | |
|  |  |  |  |  |  | X | X | EXTENSION OFF HOOK |
|  |  |  |  | X | X |  |  | OTHER STATE INFO |
|  |  |  | X |  |  |  |  | OTHER STATE INFO |
|  |  | X |  |  |  |  |  | OTHER STATE INFO |
| X | X |  |  |  |  |  |  | OTHER STATE INFO |

| BIT POSITION | | | | | | | | DESCRIPTION |
|---|---|---|---|---|---|---|---|---|
| 7 | 6 | 5 | 4 | 3 | 2 | 1 | 0 | |
|  |  |  |  |  |  | X | X | FAR END HOOK STATE |
|  |  |  |  | X | X |  |  | OTHER STATE INFO |
|  |  |  | X |  |  |  |  | OTHER STATE INFO |
|  |  | X |  |  |  |  |  | OTHER STATE INFO |
| X | X |  |  |  |  |  |  | OTHER STATE INFO |

258

| PACKET INDEX | FIELD NAME | |
|---|---|---|
| 0X00 | PNUM & PID | ~ 452 |
| 0X01 | DIAL COMMAND | ~ 454 |
| 0X02 | DIALSTRING1 | ~ 456 |
| 0X03 | DIALSTRING2 | |
| 0X04 | DIALSTRING3 | |
| 0X05 | DIALSTRING4 | |
| 0X06 | DIALSTRING5 | |
| 0X07 | DIALSTRING6 | |
| 0X08 | DIALSTRING7 | |
| 0X09 | DIALSTRING8 | |
| 0X0A | DIALSTRING9 | |
| 0X0B | DIALSTRING10 | ~ 458 |
| 0X0C | CHECKSUM | ~ 460 |
| 0X0D | CHECKSUM | ~ 462 |

Table 450

FIG. 9

Call History (500)

Call Back    Caller Details    Delete

| Type | Name | Number | Date/Time | Length |
|---|---|---|---|---|
| In | Mrs. Horton | (425)555-0103 | 6/3/98 12:02:19.. | 0 min. 40 sec. |
| Out | Unknown | (425)555-9909 | 6/2/98 1:30:12 PM | 0 min. 56 sec. |
| In | Private | (425)555-0044 | 6/1/98 7:52:55 PM | 0 min. 12 sec. |
| In | Len Zuvela | (425)555-1004 | 6/1/98 6:30:22 PM | 5 min. 43 sec. |
| Out | Len Zuvela | (425)555-1004 | 6/1/98 6:02:34 PM | 0 min. 30 sec. |
| Out | John Chiloyan | (425)555-8888 | 6/1/98 5:30:23 PM | 7 min. 23 sec. |

512, 514, 516

Settings

FIG. 10

МЕТHOD AND APPARATUS FOR LOGGING DTMF PHONE SYMBOLS DIALED FROM AN EXTENSION

BACKGROUND OF THE INVENTION

The present invention relates to phone systems. In particular, the present invention relates to phone systems that keep a log of outgoing phone calls.

Recently, personal computers (PCs) have been used to manage phone systems for small businesses and homes. These PC-based systems typically use the personal computer as an interface for monitoring or interacting with calls. For example, in one system, the personal computer is used to answer phone calls and record messages from callers. Icons are then displayed on the PC's display unit to represent the recorded messages. If the user wants to play a message, they simply activate the appropriate icon. In other systems, the personal computer has been used to display a log of recent incoming and, in some systems, outgoing calls. In areas where caller identification (Caller ID) is available, incoming call logging systems are even able to store the caller's phone number and in some cases the caller's name.

Currently, these individual features are not efficiently integrated into a single PC-based phone system and redundant components are often needed to achieve all of the features described above.

SUMMARY OF THE INVENTION

A method and apparatus logs outgoing phone symbols dialed from an extension. To log the phone symbols, a switching network is coupled to the phone lines and passes analog Dual Tone Multiple Frequency signals from the extension to a CODEC. The CODEC converts the analog signal it receives into a series of digital values that are passed to a digital signal processor. The digital signal processor decodes the series of digital values into a set of dialed-symbol values indicative of symbols dialed from the extension. The dialed-symbol values are packaged by a processing unit interface and transmitted to a processing unit where they are stored in a log database.

BRIEF DESCRIPTION OF THE DRAWINGS

FIG. 6 is a data structure for a state data packet passed between a base station and a personal computer under the present invention.

FIG. 7 is a table showing the layout of a byte of the data structure of FIG. 6.

FIG. 8 is a table showing the layout of a second byte of the data structure of FIG. 6.

FIG. 9 is a data structure for a dialed-symbol packet under the present invention.

FIG. 10 is an example of a phone log on a display.

DETAILED DESCRIPTION OF ILLUSTRATIVE EMBODIMENTS

Figure 1:
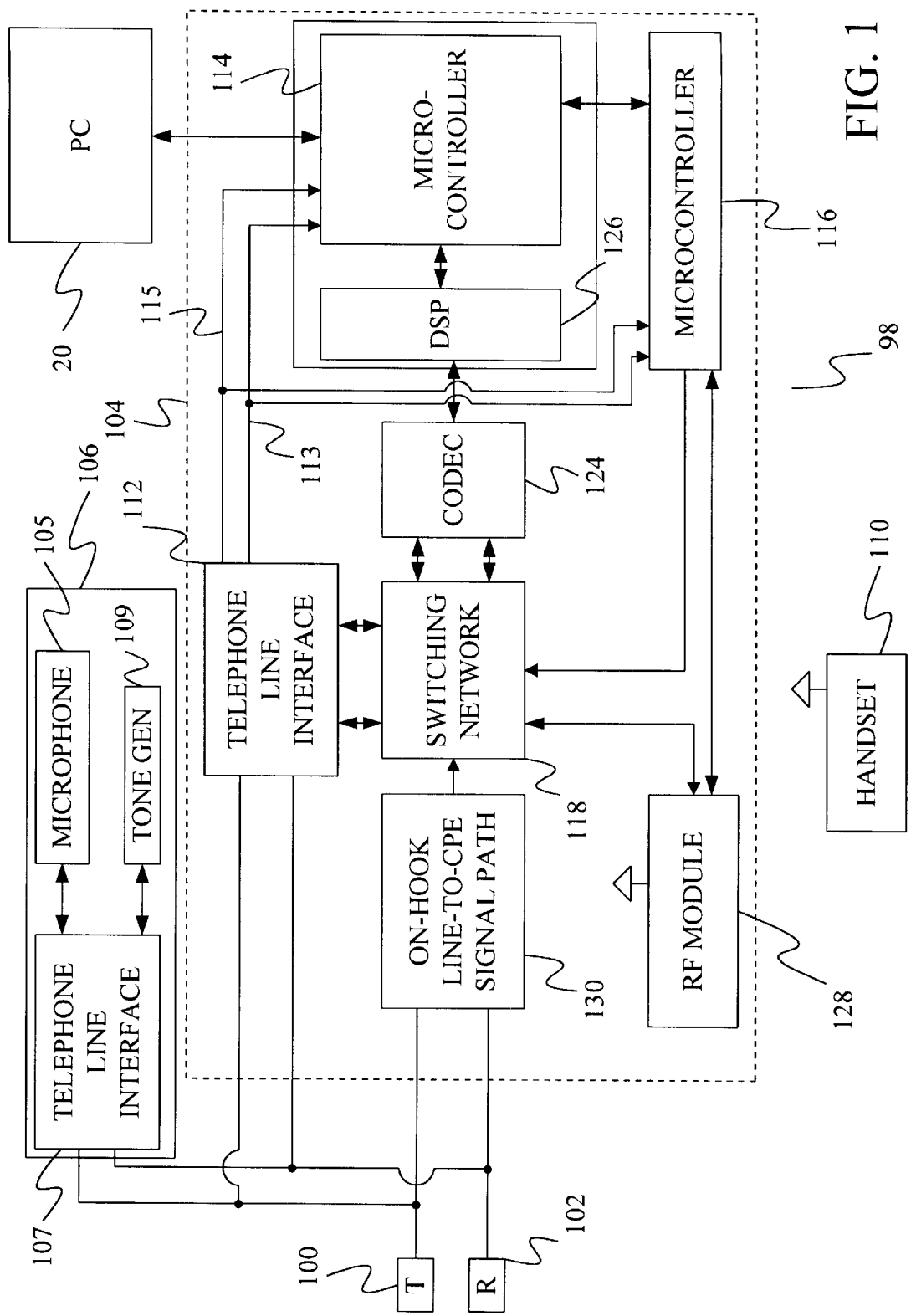
FIG. 1 is a block diagram of a phone system of the present invention.

FIG. 1 is a block diagram of a phone system 98 under the present invention that is connected to phone lines represented by tip line 100 and ring line 102. Tip line 100 and ring line 102 are connected to a central office (not shown) operated by a phone company. Within phone system 98, tip line 100 and ring line 102 are connected to a base station 104 and one or more extensions 106. Extension 106 may be connected to any type of customer premises equipment (CPE) such as a phone, a fax machine, an answering machine, or a personal computer. Additional telephone extensions may be attached to tip line 100 and ring line 102 but are not shown in FIG. 1 for clarity.

Base station 104 is connected to a personal computer 20 and communicates with a handset 110 either through a cord attached between base station 104 and the handset or through radio waves transmitted between base station 104 and handset 110. In one embodiment, the radio waves have a frequency in the range of 900 megahertz, although the particular frequency or frequencies used is not critical and one or more frequencies may be used. Additionally, the phone may operate on a single frequency or at multiple frequencies according to spread spectrum principles. Base station 104 acts as an interface between personal computer 20 and the phone lines of the central office, extension 106, and handset 110. Under this structure, personal computer 20, handset 110, and phone lines 100 and 102 can each be thought of as both an input device providing input to base station 104 and an output device receiving output from base station 104.

In its capacity as an interface between these input/output devices, base station 104 translates information provided by one of the input devices into a format acceptable for one of the output devices and routes the information to the appropriate output device. In addition, base station 104 generates original signals based on input signals that it receives.

Incoming calls on telephone lines 100 and 102 begin with a ring signal that includes a series of ring envelopes. This possible ring signal is received by telephone line interface 112 of base station 104, which examines the possible ring signal to determine if it is a valid ring signal.

Telephone line interface 112 examines the first ring envelope to determine if it has the proper voltage and frequency to possibly be considered a valid ring signal. If telephone line interface 112 determines that the ring signal may be a valid ring signal, it passes a digital ring detect envelope along a line 113 to microcontrollers 114 and 116 within base station 104. The digital ring detect envelope is a binary signal that has one value for the duration of a detected analog ring envelope and another value at all other times.

Microcontrollers 114 and 116 measure the duration of the digital ring envelope to ensure that the minimum duration of the envelope exists. If the envelope exists for a minimum amount of time, the ring signal is considered valid.

If a valid ring signal is detected, microcontroller 114 notifies personal computer 20 that a valid ring has been detected. At roughly the same time, microcontroller 116 examines a ring tone enable flag stored in a buffer associated with microcontroller 116. The status of the flag determines whether ring tone generation is enabled in base station 104 at the time the ring-detect signal is received.

If ring tone generation is enabled, microcontroller 116 passes a digital ring generation packet to a Radio Frequency (RF) module 128, which acts as a transmitter by transmitting the packet to handset 110 using radio frequency signals. In this context, microcontroller 116 acts as a ring generator.

During the ring signal, switching network 118 is configured to connect line-to-cpe path 130 to CODEC 124. In this configuration, when caller identification (caller ID) information is present on lines 100 and 102, it is routed through line-to-cpe path 130 and switching network 118 and into CODEC 124. CODEC 124 converts the analog caller ID information into encoded digital values, which are provided to a digital signal processor 126. The caller ID information is then decoded from the encoded digital values by digital signal processor 126 and the decoded information is stored in a buffer until it is transmitted to personal computer 20 by microcontroller 114.

The caller ID information is used by personal computer 20 to generate a log of incoming calls and to announce and/or display who is calling. If there is no caller ID information on lines 100 and 102, computer 20 logs the time and duration of the call but does not log any caller information.

If after ringing begins, a user activates handset 110 to take the call, switching network 118 is configured so that a communication path is created that extends from phone lines 100 and 102, through telephone line interface 112, switching network 118, and RF module 128, to handset 110. This allows the user to converse with the party on the other end of the line.

If the call is answered from an extension phone, by taking the extension phone "off-hook", a speaker and microphone assembly 105 in the extension phone are connected to the phone lines through a telephone line interface 107. Note that after a call has been answered on either the extension phone or the handset, another connection can be made to the call by taking either the extension CPE or the handset off-hook.

In one embodiment, if a user does not answer the call after a predetermined number of ring envelopes on the ring signal, the call is routed to answering machine software stored in personal computer 20. This routing sends voice signals from phone lines 100 and 102, through telephone line interface 112, and switching network 118, to CODEC 124, where the analog signals are converted into encoded digital signals. The encoded digital signals are then provided to digital signal processor 126, which decodes the encoded digital signals into a set of digital values that are buffered until they are packaged by microcontroller 114 to be sent to personal computer 20.

In this configuration, personal computer 20 can also decode Dual Tone Multiple Frequency (DTMF) signals that are created when the caller dials one or more symbols on their phone. Under the Dual Tone Multiple Frequency system, each dialed symbol generates an analog signal consisting of two different frequencies. Table 1 below shows the two signal frequencies created for each symbol, with low frequency signals shown along the vertical border and high frequency signals shown along the horizontal border.

TABLE 1

| DTMF | 1209 Hz | 1336 Hz | 1477 Hz | 1633 Hz |
| --- | --- | --- | --- | --- |
| 697 Hz | 1 | 2 | 3 | A |
| 770 Hz | 4 | 5 | 6 | B |
| 852 Hz | 7 | 8 | 9 | C |
| 941 Hz | * | 0 | # | D |

Figure 2:
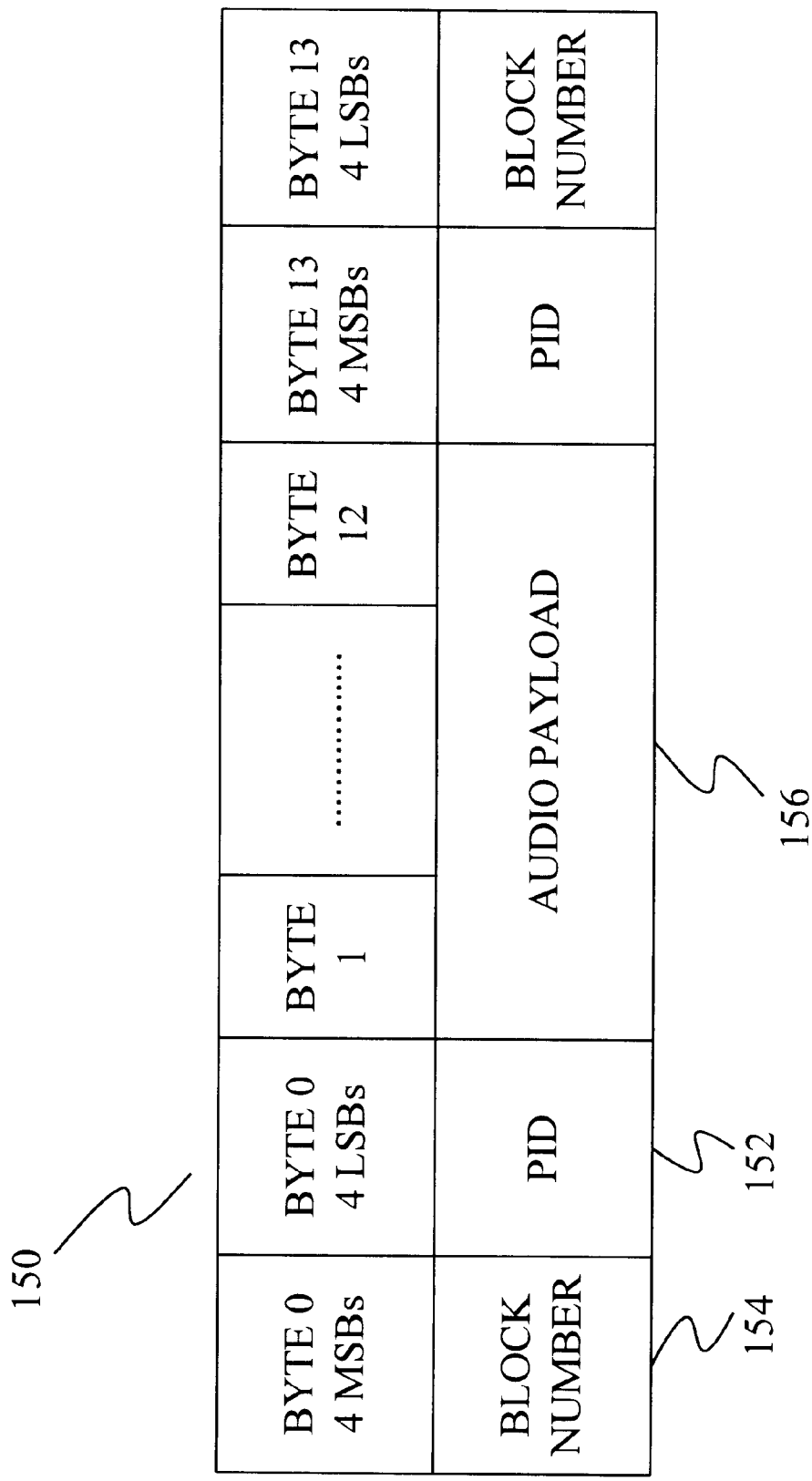
FIG. 2 is an example of an audio data packet of the present invention.

The DTMF signals and any speech signals from the caller are routed from microcontroller 114 to personal computer 20 using an audio packet 150 of FIG. 2. Audio packet 150 includes a header byte that is divided into a block number nibble 154 and an audio packet identifier nibble 152. Block number nibble 154 is used to identify the order of individual audio packets that together form a complete audio signal. Audio packet identifier nibble 152 identifies this packet as containing audio data instead of command data.

After audio packet identifier nibble 152, audio data packet 150 includes twelve bytes of audio data, which are denoted as audio payload 156. In one embodiment, an eight-bit encoding format is used to encode the audio data where the most significant bit is a polarity bit, the next three bits represents a segment code and the four remaining bits represent a quantization code.

The last byte of audio packet 150 is the same as the first byte, except that the position of the nibbles has been reversed.

Figure 3:
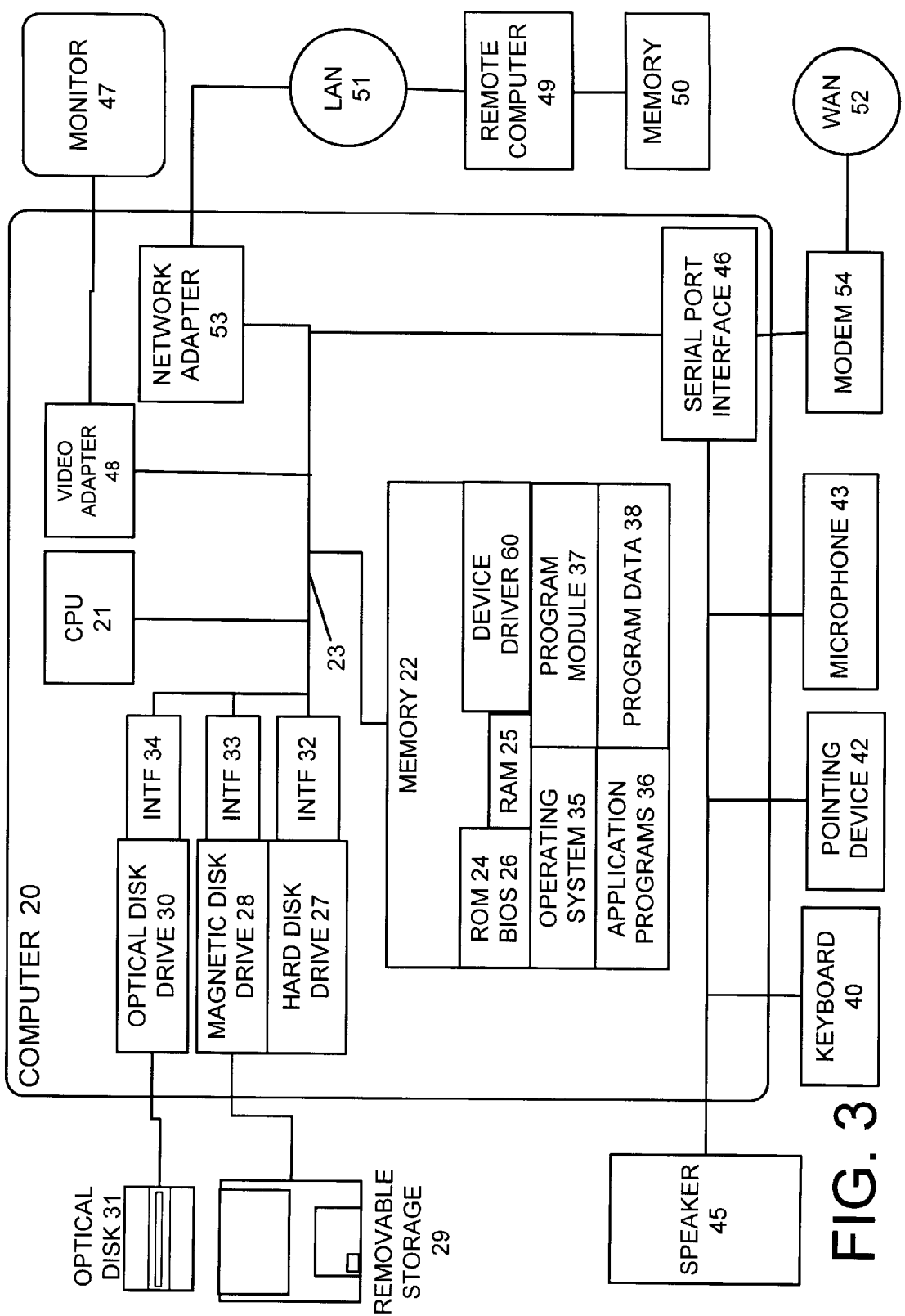
FIG. 3 is a general block diagram of the personal computer of FIG. 1 and its associated peripherals.

FIG. 3 provides a general block diagram of computer 20 and related devices associated with computer 20. FIG. 3 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24, which could also be FLASH BIOS. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 3. The logic connections depicted in FIG. 3 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Figure 4:
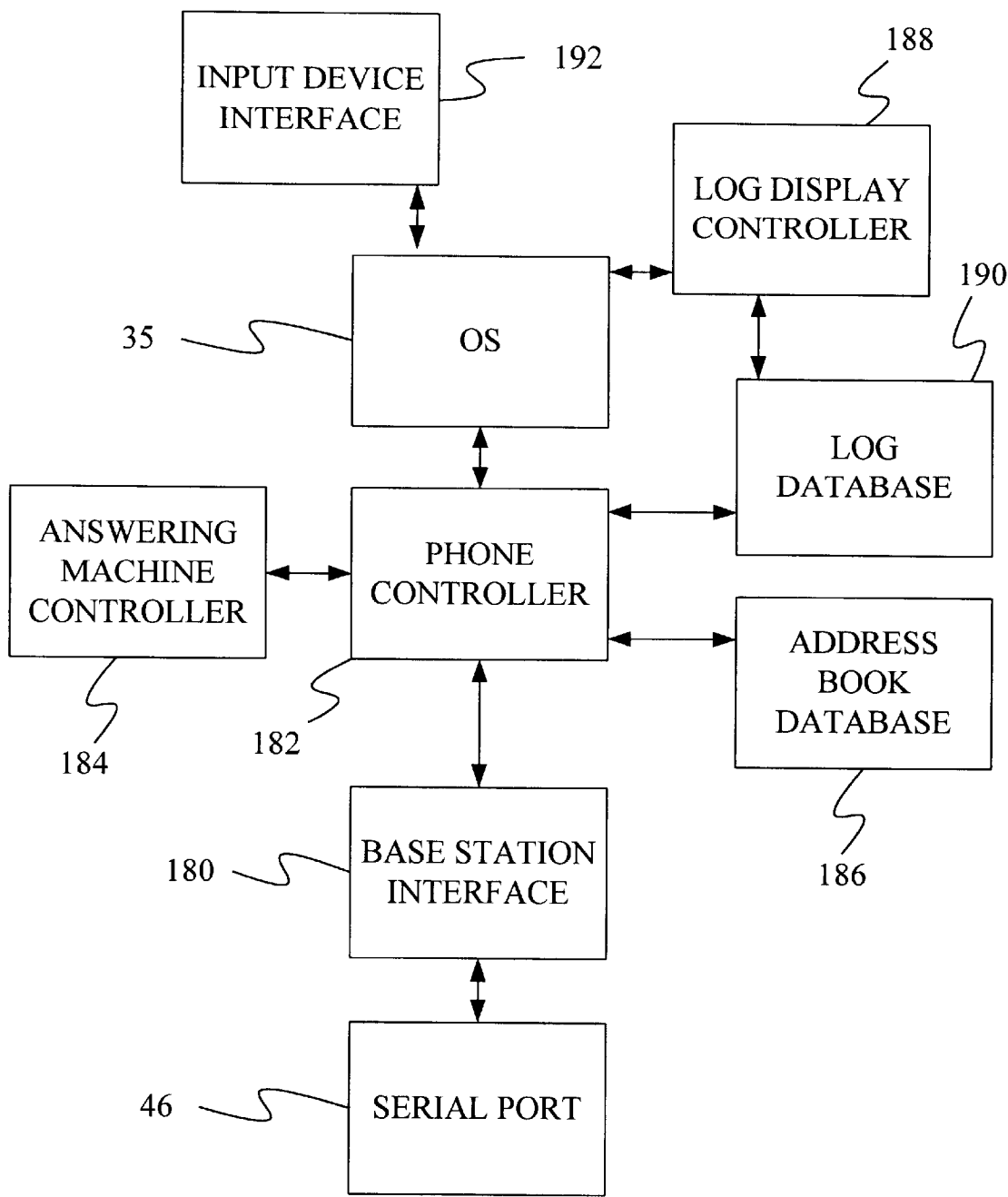
FIG. 4 is a block diagram of the personal computer of FIG. 3 showing in more detail elements that are particularly relevant to the present invention.

FIG. 4 provides a more detailed block diagram of the elements of computer 20 most germane to the present invention including those useful in describing the operation of computer 20 when it receives an audio packet from base 104 of FIG. 1 while answering machine software is active on computer 20. In FIG. 4, an audio packet such as packet 150 of FIG. 2 is first received serially by serial port 46. Although a simple serial port is shown in the embodiment of FIG. 4, other types of ports may be used such as a Universal Serial Bus port. Serial port 46 converts the serial packet into a series of parallel packets that are forwarded to a base station interface 180, which strips the command and audio information from the data packet. Base station interface 180 then forwards the command and the audio information to a phone controller 182.

Phone controller 182 is the main controller for the personal computer portion of the phone system. Phone controller 182 monitors the current state of the phone system and routes data packets from base station 104 to appropriate software units on personal computer 20.

When phone controller 182 receives an audio data packet, such as data packet 150 of FIG. 2, while the phone system is in an answering machine mode, phone controller 182 routes the audio data to an answering machine controller 184. Answering machine controller 184 includes a DTMF detection filter that detects and decodes any DTMF data present in the audio data to produce one or more dialed-symbol values that represent the symbols that were dialed to create the DTMF signals. Answering machine controller 184 also monitors the current state of the answering machine including whether it is currently playing a message, has just finished playing a message, has just deleted a message and so forth. Based on the current state of the answering machine, phone controller 182 performs one or more functions as a result of the recovered dialed-symbol values. For example, if the user has just finished listening to a message and they press key "5", answering machine controller 184 will repeat the message.

The phone system of the present invention also permits logging of outgoing calls. In particular, the present invention logs phone numbers dialed from an extension. A method of logging such numbers is described below with reference to the flow diagram of FIG. 5 and the block diagrams of FIGS. 1 and 4.

Figure 5:
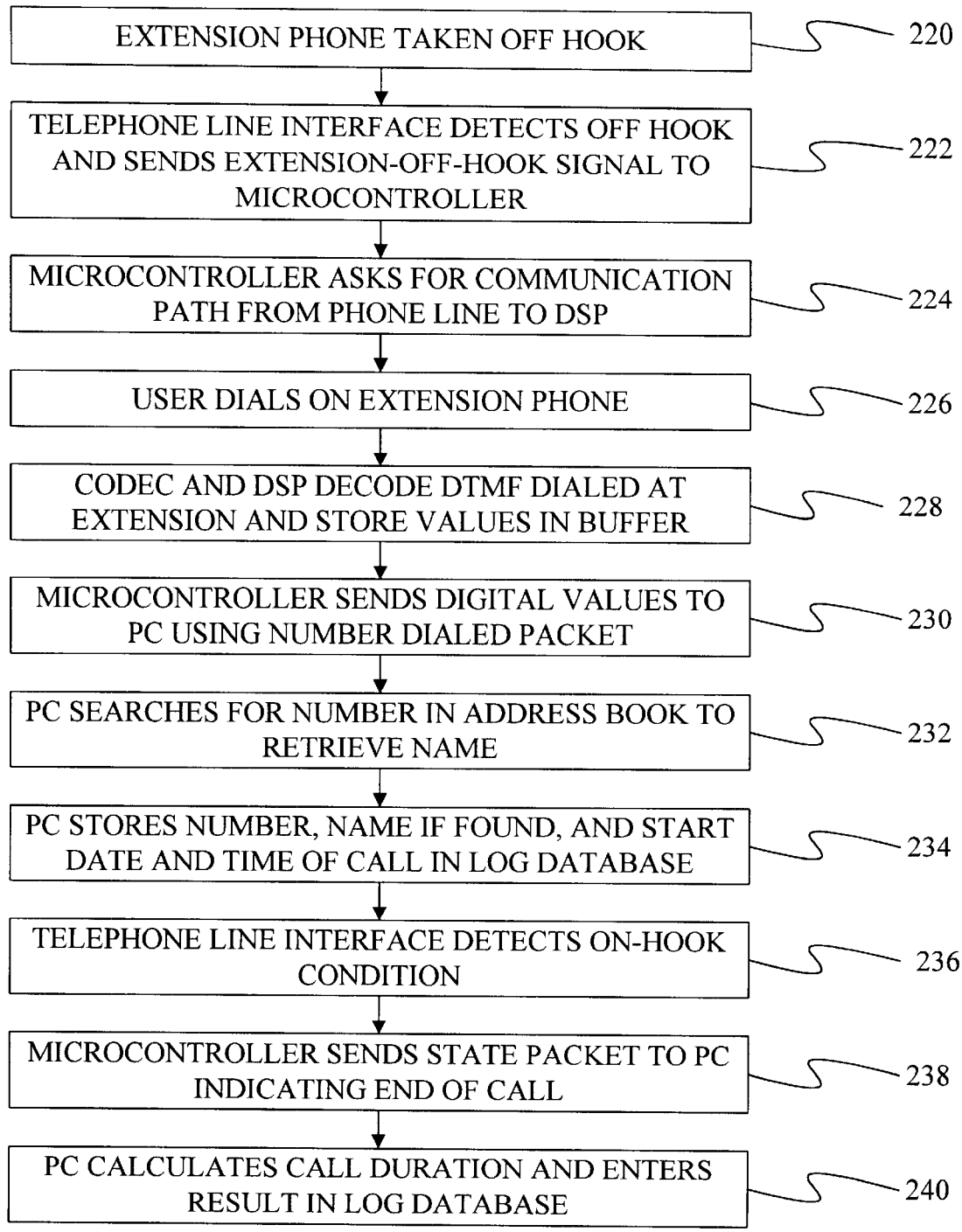
FIG. 5 is a flow diagram of a method under the present invention.

When an extension CPE is taken "off-hook" at an initial step 220 of FIG. 5, telephone line interface 112 of FIG. 1 detects a change in the signal on phone lines 100 and 102. Based on this change, telephone line interface 112 sends an extension off-hook signal to microcontroller 116 at step 222. In the embodiment of FIG. 1 the extension off-hook signal is passed to microcontroller 116 along line 115. Microcontroller 116 contains an algorithm to track the length of time the CPE is in a particular state. If the extension CPE remains off-hook for a long enough time to distinguish the event from noise on the line, microcontroller 116 considers the off-hook signal to be valid.

Upon measuring a valid off-hook signal at step 224, microcontoller 116 establishes a communication path from phone lines 100 and 102, through line-to-cpe signal path 130, switching network 118, to CODEC 124. If base station 104 is connected to an active personal computer 20, microcontroller 116 also conveys the off-hook status of the extension to personal computer 20 via microcontroller 114 using a state data packet such as data packet 250 of FIG. 6.

Data packet 250 conveys the current state of the phone system to personal computer 20. Header bytes 252 and 254 designate data packet 250 as a packet that contains state data. Bytes 256 and 260 each contain sets of binary flags that convey the current state of different portions of the phone system. These binary flags are described further below. Byte 258 of data packet 250 contains the current line connections through switching network 118 as well as the on-hook/off-hook status of base station 104 and handset 110. Bytes 266 and 268 form a sixteen-bit checksum value and the remaining bytes of data packet 250 are reserved.

FIG. 7 is a table showing the layout of state byte 256 of FIG. 6. The two least significant bits 276 and 278 indicate whether any extension connected to the phone system is off-hook. In one embodiment, these two bits have three different values for conveying the on-hook/off-hook status of an extension. A value of 00 binary indicates that all of the extensions are on-hook; a value of 01 indicates that one or more of the extensions is off-hook; and a value of 10 indicates that the base station cannot tell if an extension is off-hook because the base station is off-hook. The remaining bits of byte 256 can be used to convey the status of other aspects of the phone system.

FIG. 8 is a table showing the layout of byte 260 of FIG. 6. In the embodiment of FIG. 8, the least significant bits 280 and 282 of byte 258 convey the current hook status of a phone on the far-end of phone lines 100 and 102 of FIG. 1. A value of 00 indicates that the phone on the far-end is off-hook and a value of 01 indicates that the phone on the far-end is on-hook. This information can be used to indicate when someone calling the phone system has disconnected.

Returning to the flow diagram of FIG. 5, at step 226 the user who took the extension off-hook begins dialing using the extension phone's key pad. In response to the key presses, a tone generator 109 in extension phone 106 of FIG. 1 generates the appropriate DTMF signals according to the relationships between keys and tones found in Table 1 above.

The DTMF signals created by tone generator 109 pass out along phone lines 100 and 102 to the phone company's central office, which uses the DTMF signals to connect the call. At the same time, because of the communication path established at step 224 above, CODEC 124 and digital signal processor 126 receive and decode the DTMF signals into key values at a step 228. Specifically, CODEC 124 converts the analog DTMF signals into digital values that are passed to digital signal processor 126. Digital signal processor 126 includes a digital filter that filter's and decodes the DTMF signals to generate a set of dialed-symbol values. The set of dialed-symbol values are then stored in a buffer associated with microcontroller 116 via microcontroller 114. If base station 104 is not attached to an active personal computer, the dialed symbols remain in the buffer until a connection to a computer is made. In many embodiments, base station 104 can store multiple sets of dialed symbols to allow a log of dialed symbols to be stored on the base station for later transfer to a personal computer.

At step 230, if base station 104 is connected to an active personal computer 20, the dialed-symbol values stored at step 228 are retrieved by microcontroller 116 and sent to personal computer 20 via microcontroller 114 in a dialed-symbol data packet. An example of a dialed-symbol data packet 450 is shown in FIG. 9. Header byte 452 indicates that this is a command data packet and header byte 454 indicates that this is a data packet that includes dialed symbols. The next ten bytes, from byte 456 to byte 458, contain the symbols that were dialed. In the embodiment of FIG. 9, each of these bytes can contain up to two of the dialed symbols. When this occurs, the first nibble represents one of the dialed symbols and the second nibble represents a second dialed symbol. In this embodiment, dialed numbers "1" through "9" are represented by hex values 0X1 through 0X9. The "0" symbol, the "*" symbol and the "#" symbol are represented by hex values 0XA, 0XB, and 0XC, respectively. In some embodiments, an extended set of symbols is supported that are represented by an extension nibble followed by a symbol-value nibble. Such full-byte symbols can occupy a single byte of the ten bytes between byte 456 and byte 458, or may extend across two consecutive bytes. Bytes 460 and 462 represent the most significant eight bits and the least significant eight bits, respectively, of a sixteen bit checksum value, which is the two's compliment of the sum of all of the bytes in data packet 450, excluding the check sum bytes.

At step 232 of FIG. 5, personal computer 20 uses the dialed number in data packet 450 to search through an address book database 186 shown in FIG. 4. In one embodiment, data packet 450 is sent serially to serial port 46, which converts the serial data into a set of parallel data values. The dialed numbers and the header identifying the data packet as containing dialed numbers are stripped from the data packet by base station interface 180, which forwards this information to phone controller 182. Phone controller 182 then accesses address book database 186 in an attempt to locate a record with the dialed phone numbers. If it locates such a record, it retrieves the name associated with the numbers.

At step 234 of FIG. 5, personal computer 20 stores the dialed numbers, the associated name if it finds a record in address book database 186, and the start date and time of the phone call in a log database 190 of FIG. 4.

When the phone call is complete, the extension will be placed back on-hook. At step 236, telephone line interface 112 detects that the extension is back on-hook and relays this information to microcontroller 116 through line 115. At step 238, microcontroller 116, via microcontroller 114, sends personal computer 20 another state packet that is similar to state packet 250 of FIG. 6. In the state packet, microcontroller 116 indicates that all of the extensions are on-hook and that the far-end phone is on-hook using state bits 276, 278, 280, and 282 of FIGS. 7 and 8.

At step 240, phone controller 182 of FIG. 4 receives the state packet and based on the fact that the call has ended, retrieves the start time of the call from log database 190. Phone controller 182 then calculates the duration of the phone call based on the start time and the time at which the call was terminated. The call duration is then stored in log database 190 for this call.

The information stored in log database 192 can be viewed on monitor 47 and/or printed on one or more printers associated with computer 20. In FIG. 4, these display functions are controlled by a log display controller 188 that communicates with an operating system 35 and log database 190. The user may navigate through the display using an input device that passes commands to an input device interface 192 that is connected to operating system 35. Operating system 35 then forwards these input device messages to log display controller 188.

An example of an interactive display 500 generated by log display controller 188 is shown in FIG. 10. Entries 512, 514, and 516, each show logged information for an outgoing call. In entry 512, the dialed number was not found in the address book database, so a value of "UNKNOWN" was entered for the name of the person called. In entries 514, and 516, the number was found in address book database 186, and the corresponding names were stored in log database 190. In alternative embodiments, an additional field is present in log display 500 to indicate whether the outgoing call was made from the base station or from an extension.

Although the answering machine and logging functionality have been discussed with reference to a personal computer, those skilled in the art will understand that this functionality may be achieved in the base station by adding appropriate components to the base station. In this context, the personal computer can be viewed generically as a processing unit and microcontrollers 114 and 116 can be viewed as interfaces to the processing unit.

In addition, although specific layouts have been described for various data packets, other layouts are possible. In addition, the size of the fields in the data packets or the types of fields in the data packets may be changed within the scope of the present invention.

Although the present invention has been described with reference to particular embodiments, workers skilled in the art will recognize that changes may be made in form and detail without departing from the spirit and scope of the invention.

What is claimed is:

1. An apparatus for logging outgoing phone numbers dialed from an extension connected to a phone line, the apparatus comprising:

a switching network coupled to the phone line;

a CODEC coupled to the switching network and capable of converting an analog signal on the phone line into a series of digital values;

a digital signal processor coupled to the CODEC for decoding the series of digital values into a series of dialed-symbol values representing symbols dialed on an extension when the analog signal comprises a Dual Tone Multiple Frequency signal produced by the extension and for decoding the series of digital values into a series of decoded digital values when the analog signal comprises a Dual Tone Multiple Frequency signal produced by a caller phone;

a processing unit interface coupled to the digital signal processor and capable of packaging the series of dialed-symbol values into a data packet and capable of packaging the decoded digital values into a second data packet; and a processing unit, comprising a personal computer, coupled to the processing unit interface and capable of receiving the data packet from the interface, retrieving the dialed symbol values from the data packet and storing the dialed-symbol values in a log database, wherein the personal computer further comprises computer readable instructions for performing answering machine functions comprising instructions for converting decoded digital values in the second data packet into dialed-symbol values.

2. The apparatus of claim 1 further comprising a telephone line interface coupled between the telephone line and the processing unit interface and capable of detecting when the extension is off-hook and of sending an off-hook signal to the processing unit interface that is indicative of the extension being off-hook.

3. The apparatus of claim 2 wherein the processing unit interface is a microcontroller.

4. The apparatus of claim 3 wherein the switching network, CODEC, digital signal processor, and microcontroller form at least part of a base station and wherein the apparatus further comprises a handset in communication with the base station.

* * * * *